United States Patent
Juillen et al.

(10) Patent No.: US 11,400,662 B2
(45) Date of Patent: Aug. 2, 2022

(54) METHOD FOR MANUFACTURING A STIFFENED STRUCTURAL PANEL FOR AN AIRCRAFT

(71) Applicant: AIRBUS OPERATIONS (S.A.S.), Toulouse (FR)

(72) Inventors: Lionel Juillen, Toulouse (FR); Denis Soula, Toulouse (FR); Eric Dupuy, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 307 days.

(21) Appl. No.: 16/599,847

(22) Filed: Oct. 11, 2019

(65) Prior Publication Data
US 2020/0114595 A1 Apr. 16, 2020

(30) Foreign Application Priority Data
Oct. 12, 2018 (FR) ........................ 1859500

(51) Int. Cl.
*B29C 70/46* (2006.01)
*B29C 70/14* (2006.01)
(Continued)

(52) U.S. Cl.
CPC ............ *B29C 70/465* (2013.01); *B29C 70/14* (2013.01); *B29C 70/205* (2013.01); *B64C 1/00* (2013.01);
(Continued)

(58) Field of Classification Search
None
See application file for complete search history.

(56) References Cited

U.S. PATENT DOCUMENTS

| 3,772,126 A | * | 11/1973 | Myers | ...................... D04H 3/00 |
| | | | | 156/434 |
| 4,086,378 A | * | 4/1978 | Kam | ...................... B29C 70/22 |
| | | | | 428/34.5 |

(Continued)

FOREIGN PATENT DOCUMENTS

| EP | 2 585 287 | 5/2013 |
| EP | 2 669 082 | 12/2013 |

(Continued)

OTHER PUBLICATIONS

Bharath et al "Design and analysis of grid stiffened fuselage panel with curved stiffeners", AIP Conference proceedings 1943, 020006 (2018) published online Apr. 20, 2018.*

(Continued)

*Primary Examiner* — Jeffry H Aftergut
(74) *Attorney, Agent, or Firm* — Nixon & Vanderhye P.C.

(57) ABSTRACT

A method of manufacturing stiffened structural panel for an aircraft including a main sheet made of composite material with unidirectional fibers, and a stiffening structure secured to the main sheet and made of a composite material comprising a resin and chopped fibers, the stiffening structure including on the one hand a base adhering to one of the two lateral faces of the main sheet, and a network of stiffeners in the form of a grid projecting from the base. The method includes a step of compression molding the stiffening structure from a block formed of a prepolymer reinforced with chopped fibers.

16 Claims, 9 Drawing Sheets

(51) Int. Cl.
  *B64F 5/10* (2017.01)
  *B29C 70/20* (2006.01)
  *B64C 1/00* (2006.01)
  *B29K 105/08* (2006.01)
  *B29K 105/14* (2006.01)
  *B29K 307/04* (2006.01)
  *B29K 309/08* (2006.01)
  *B29L 31/30* (2006.01)

(52) U.S. Cl.
  CPC ........ *B64F 5/10* (2017.01); *B29K 2105/0881* (2013.01); *B29K 2105/14* (2013.01); *B29K 2307/04* (2013.01); *B29K 2309/08* (2013.01); *B29L 2031/3076* (2013.01); *B64C 2001/0072* (2013.01)

(56) References Cited

U.S. PATENT DOCUMENTS

| | | | | |
|---|---|---|---|---|
| 4,357,292 | A * | 11/1982 | Myers | B29C 43/14 156/181 |
| 8,061,035 | B2 * | 11/2011 | Stulc | B64C 1/12 29/897.2 |
| 9,649,820 | B1 * | 5/2017 | Boone | B29C 66/73751 |
| 2004/0035979 | A1 * | 2/2004 | McCoskey, Jr. | B64C 1/12 244/117 R |
| 2004/0055349 | A1 * | 3/2004 | El-Soudani | B64C 3/24 72/56 |

FOREIGN PATENT DOCUMENTS

| | | |
|---|---|---|
| EP | 3 208 187 | 8/2017 |
| FR | 2 889 505 | 2/2007 |
| FR | 2 948 099 | 1/2011 |
| JP | 09-165813 A * | 6/1997 |
| JP | 3457452 B2 * | 8/2003 |
| WO | 2011/162884 | 12/2011 |

OTHER PUBLICATIONS

Mulani et al , "BF3PanelOpt: An optimization framework for curvilinear blade-stiffened panels", Thin-Walled Structures 63 (2013) 13-26.*

Search Report and Written Opinion for FR1859500, dated Jun. 6, 2019, 9 pages.

* cited by examiner

Fig. 11a"

METHOD FOR MANUFACTURING A STIFFENED STRUCTURAL PANEL FOR AN AIRCRAFT

CROSS REFERENCE TO RELATED APPLICATION

This application claims priority to and incorporates by reference French Patent Application Number 1859500, filed Oct. 12, 2018.

BACKGROUND

1. Field of the Invention

The disclosure general relates to stiffened structural panels for aircraft and, more specifically, to a joining panel joining together an aircraft wing and a central wing box of this aircraft, and methods for manufacturing these stiffened panels. The disclosure also relates to a lateral panel of a rigid structure of a pylon for attaching a turbomachine, an internal stiffening rib of a central or lateral wing box, or a bulkhead that separates a pressurized zone from the outside (sealed bulkhead).

2. Description of the Related Art

An aircraft structure is formed by assembling numerous structural components which are fixed together, such as stiffened panels. These panels usually comprise a main sheet, also referred to as a "skin", to which there are attached stiffeners which act as stabilizers.

There are numerous technical solutions in existence for forming these stiffened structural panels. However, there is still a need to improve their design and their manufacture in order to improve still further their mechanical performance while at the same time rendering them compatible with high production rates.

SUMMARY

A method for manufacturing a stiffened structural panel is disclosed. The invention thus addresses the need identified hereinabove, notably in terms of ease of manufacture allowing high production rates. This is explained by the use of a composite material comprising a resin and chopped fibers from which to form the stiffening structure. This type of material proves to be particularly simple to shape, preferably by compression molding directly on the main sheet made of composite material with unidirectional fibers.

On the other hand, the mechanical performance conferred by this design is enhanced by the presence of the chopped fibers within the stiffening structure. This is because these small-sized fibers can orientate themselves locally so that they are substantially parallel to the transition zones between the stiffeners and the base of the stiffening structure. This particular orientation of the fibers in the transition zone effectively occurs as the stiffeners appear during the compression molding step, these stiffeners effectively being initially absent from the block of prepolymer reinforced with chopped fibers. In the same way, within the base of the stiffening structure, the chopped fibers can locally orientate themselves substantially parallel to the direct interface between the main sheet and the stiffening structure. These two aspects, which are made possible by the presence of the base within the stiffening structure and by the use of chopped fibers in this structure, contribute to improving the transfer of load between the stiffeners and the main sheet.

The method according to the invention may include at least one of the following features, considered in isolation or in combination.

The other of the two lateral faces of the main sheet forms an exterior surface of the panel.

The chopped fibers have a major length of between 10 and 100 mm.

The panel has at least one of the following dimensions:
maximum length of the panel: between 1 and 8 m, and may be greater than 2 m;
maximum height of the stiffeners projecting from the base: between 30 and 150 mm, and may be greater than 30 mm;
thickness of the base: between 1 and 5 mm;
thickness of the stiffeners: between 1 and 10 mm, and may be between 2 and 5 mm;
thickness of the main sheet: between 1 and 40 mm, and may be between the thickness of the base and 40 mm.

The base of the stiffening structure covers substantially the entirety of the lateral face of the main sheet to which it adheres.

The stiffeners have uniform or non-uniform heights.

The other of the two lateral faces of the main sheet is structured.

The panel has at least one opening passing through the main sheet and the stiffening structure.

The stiffening structure is made from a block of SMC material.

At least one stiffener of the network has at least one curved transition zone between one of its lateral faces and the base of the stiffening structure.

The stiffened structural panel forms one of the following elements:
a joining panel joining together an aircraft wing and a central wing box of this aircraft;
a lateral panel of a rigid structure of a pylon for attaching a turbomachine;
an internal stiffening rib of a lateral wing box or of the central wing box, or of any other box-shaped structure (for example: aileron, vertical or horizontal tail stabilizer).

Finally, the block intended to be molded has, for example, a non-uniform original thickness.

Further advantages and features of the invention will become apparent from the non-limiting detailed description hereinbelow.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
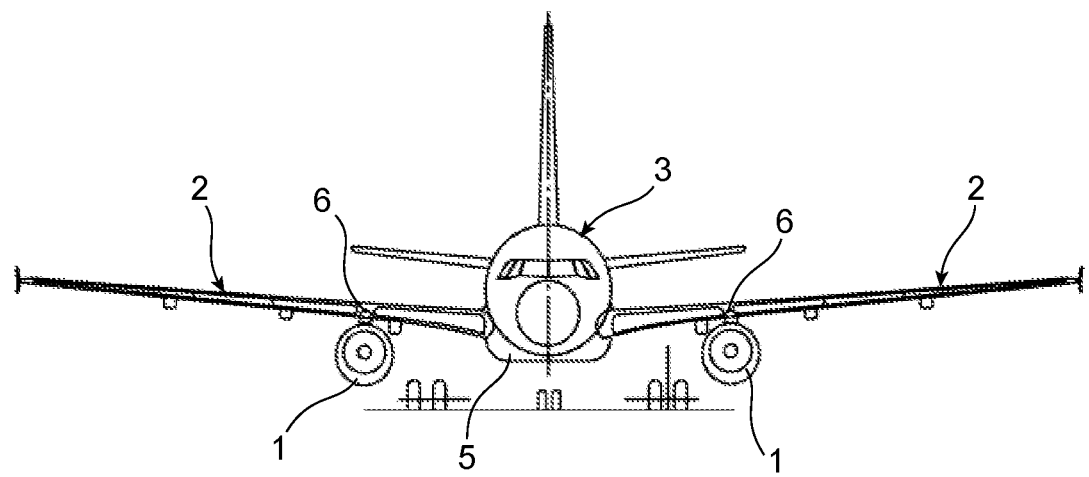
FIG. 1 is a front plan view of an aircraft.

Reference is made to FIG. 1 which depicts an aircraft 100 comprising two wings 2 fixed to a fuselage 3 by a central wing box 5 attached under this fuselage. The two wings 2 are respectively fixed to the two lateral ends of the central wing box 5. They each bear a turbomachine 1, such as a turbojet engine, via a pylon 6.

Figure 2:
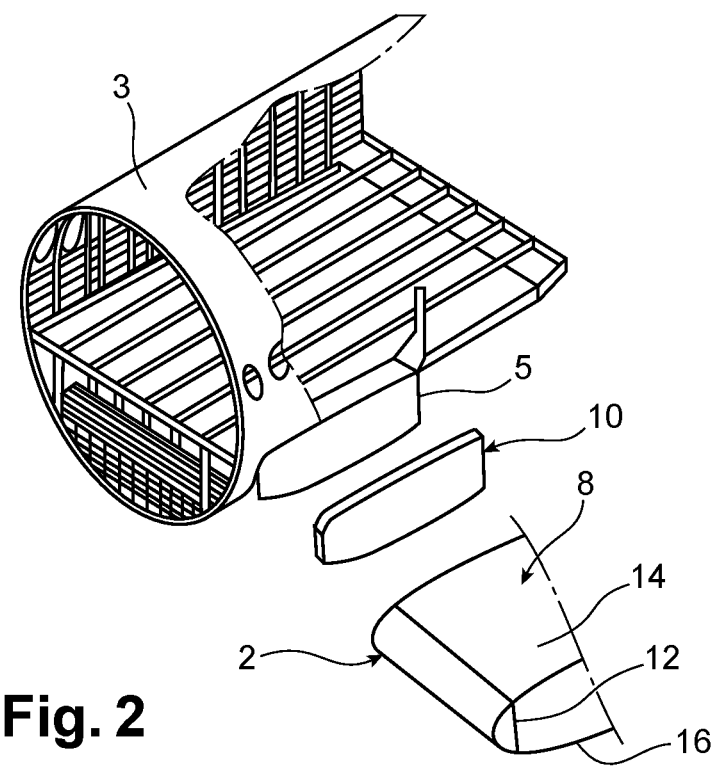
FIG. 2 is an exploded perspective view of part of the aircraft shown in FIG. 1.

In a central part of this aircraft 100, shown in exploded view in FIG. 2, each lateral end of the central wing box 5 collaborates with an internal lateral end of one of the wings 2 (just one wing 2 has been depicted partially and schematically in FIG. 2). More specifically, the wing 2 comprises a lateral wing box 8 which is intended to be fixed to the central box 5 via a stiffened structural panel 10. The lateral wing box 8 conventionally comprises a front spar 12, an extrados wall 14, an intrados wall 16 and a rear spar (which is not depicted in FIG. 2).

The stiffened structural panel 10 is thus intended to be interposed between the two boxes 5, 8, being oriented in such a way as to laterally close each of them at their ends that face one another. Components not depicted in FIG. 2 are usually added, in order to fix these three elements 5, 8, 10 together.

Figure 3:
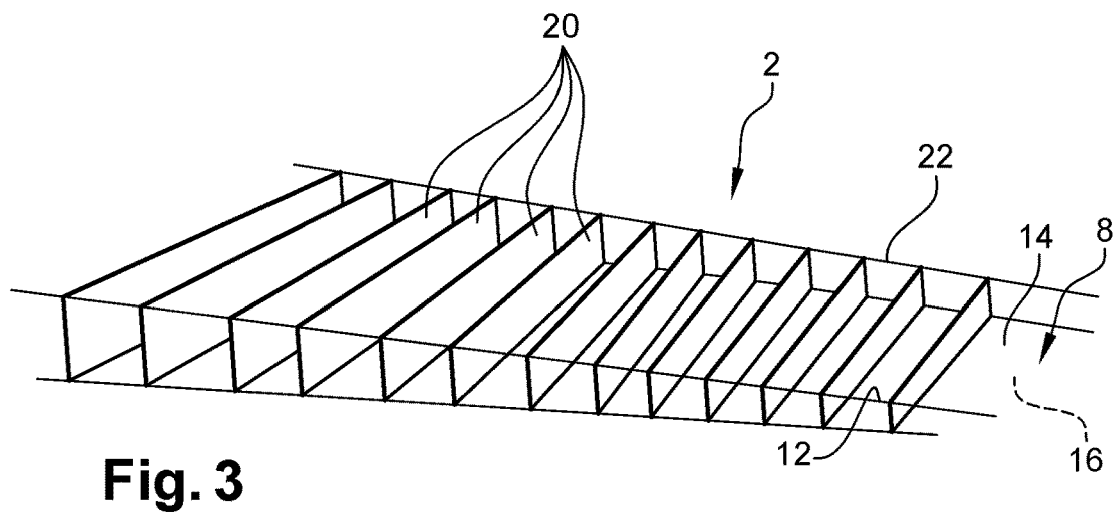
FIG. 3 is a perspective partial view of one of the wings of the aircraft shown in FIG. 1.
Figure 3A:
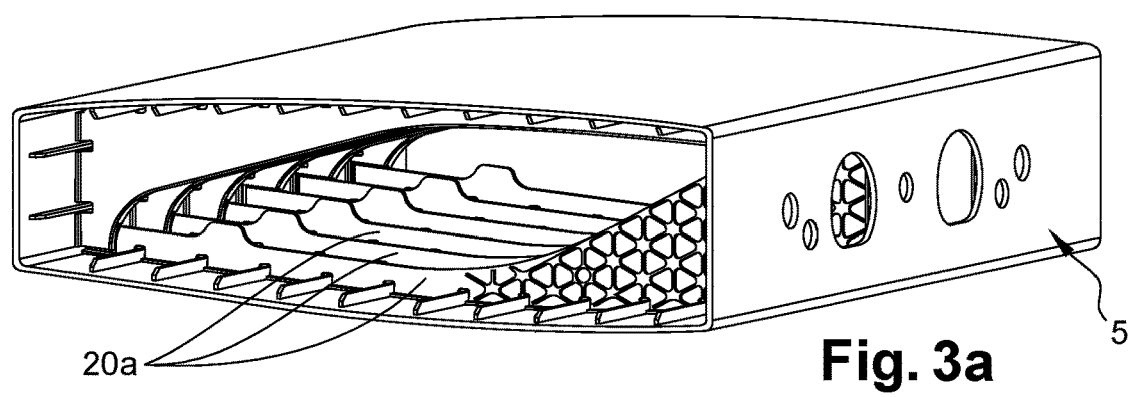
FIG. 3a is a perspective partial view of the central wing box shown in FIGS. 1 and 2.

While this application to a joining panel joining together the wing of an aircraft and the central wing box 5 remains a preferred application, the stiffened structural panel could alternatively be used to perform other functions. By way of non-limiting example, it could be an internal stiffening rib 20 of the lateral wing box 8, as indicated schematically in FIG. 3. These ribs 20 are spaced apart in the direction of the span of the wing, and each connect the front spar 12, the extrados wall 14, the intrados wall 16 and the rear spar 22. According to another possibility, it could be an internal stiffening rib 20a of the central wing box 5, as has been schematically indicated in FIG. 3a.

Figure 4:
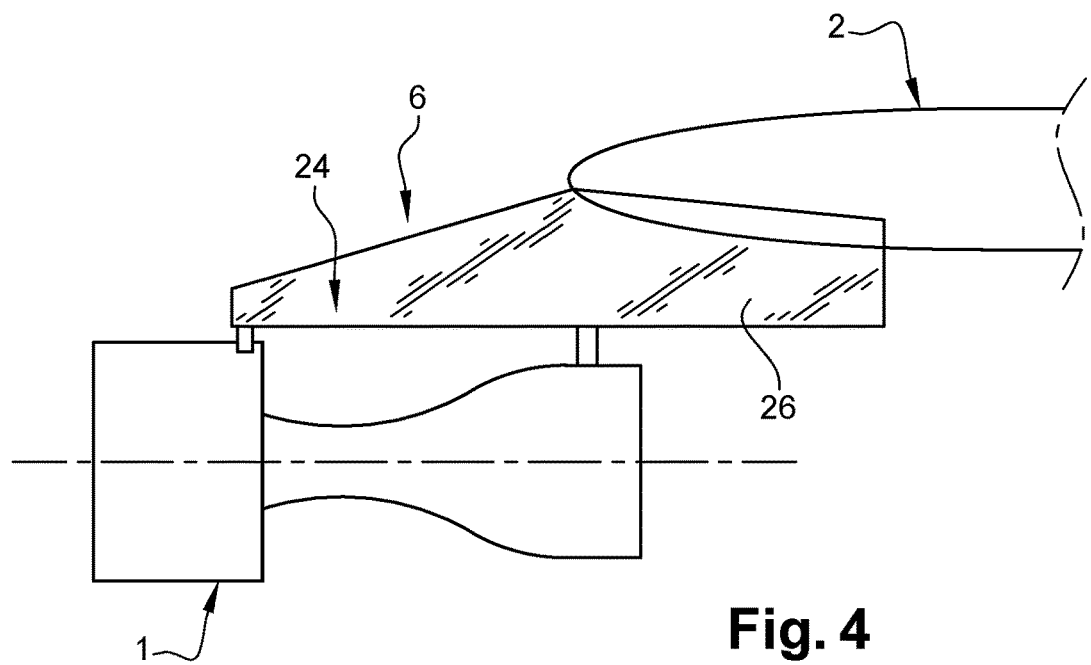
FIG. 4 is a schematic side view of the assembly between the wing and the pylon that attaches the turbomachine associated with this wing.

In another example schematically indicated in FIG. 4, the panel could be incorporated into a rigid structure 24 of the pylon 6, also referred to as the primary structure, and adopting the overall shape of a box structure designed to allow the static and dynamic loads generated by the turbomachine, such as the weight, the thrust, or else the various dynamic loads, to be transmitted to the wing. This would then preferably relate to one or both of the lateral panels 26 that form this box structure 24.

Figure 5:
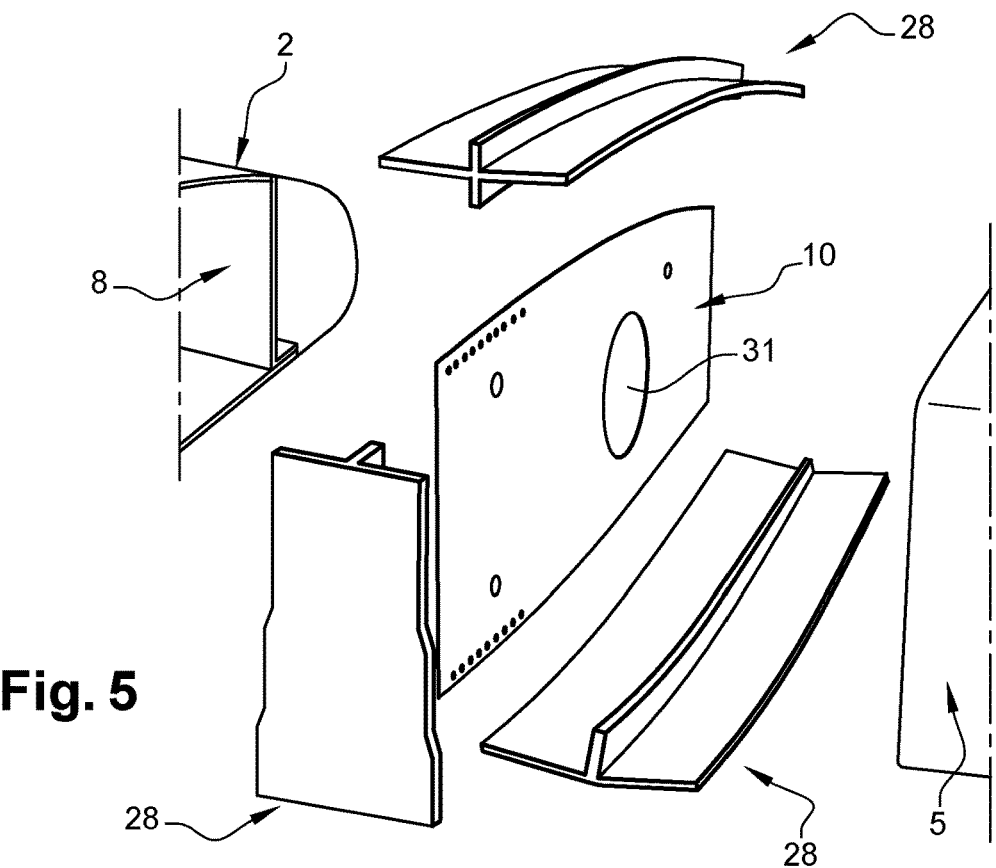
FIG. 5 is an exploded perspective view of a stiffened structural panel intended to be obtained by a method in accordance with an exemplary embodiment of the invention, the panel being shown in its environment.

An exemplary embodiment of the stiffened structural panel 10 will now be described with reference to FIGS. 5 to 10e. First of all, FIG. 5 depicts the panel 10 in its environment, arranged between the central wing box 5 and the lateral wing box 8 of the wing 2. Components 28 are provided around the stiffened structural panel 10 to fix the elements 5, 8, 10 together. The panel 10 has two opposing exterior lateral surfaces, one of which is visible in FIG. 5, oriented laterally towards the central wing box 5. This exterior lateral surface remains substantially planar, being smooth and unstructured. Conversely, the opposite exterior lateral surface of the panel 10, visible in FIG. 6, has one or more zones that are structured through the presence of a network 30 of stiffeners in the form of a grid. Here, there are for example two networks 30 of stiffeners which are provided on this same exterior lateral surface of the panel 10, these being respectively arranged in a forward zone and in a rear zone of this panel. A central zone of the panel, which is situated between the two networks 30, has passing through it an opening 31 that allows communication between the two wing boxes 5, 8 connected by the panel 10, this opening 31 allowing, for example, the passage of auxiliaries.

Figure 7:
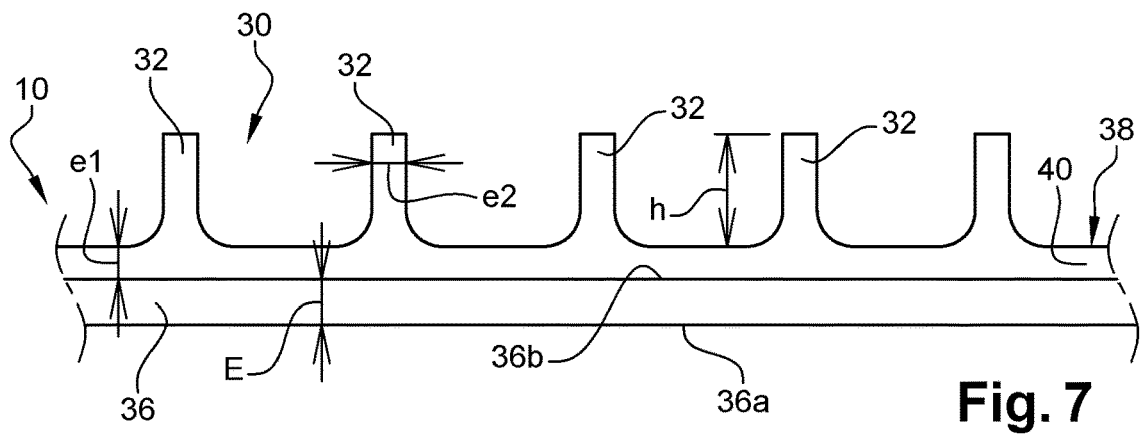
FIG. 7 is a cross-sectional view of the panel shown in FIGS. 5 and 6.
Figure 8:
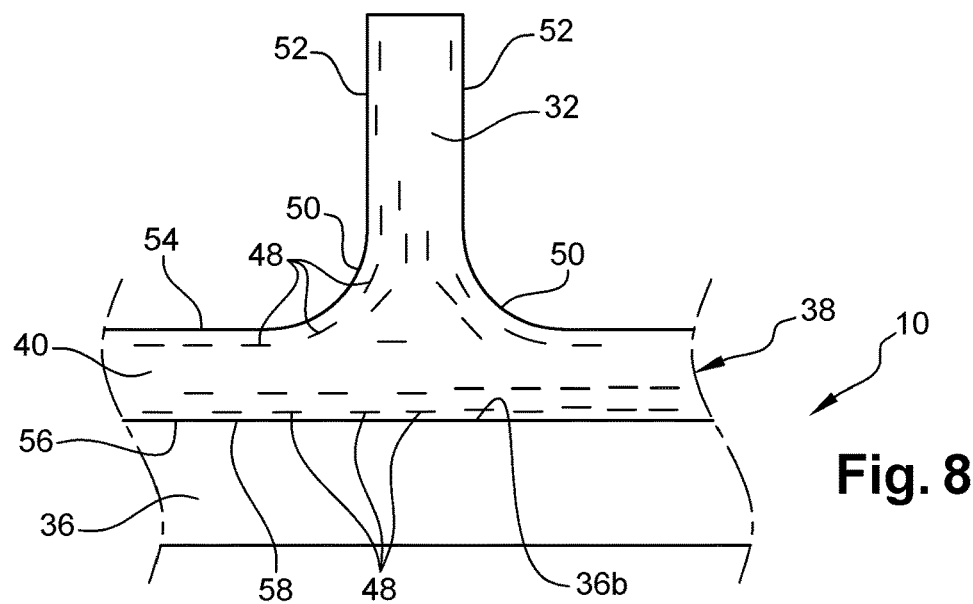
FIG. 8 is an enlarged view of the part of the panel shown in FIG. 7.
Figure 9:
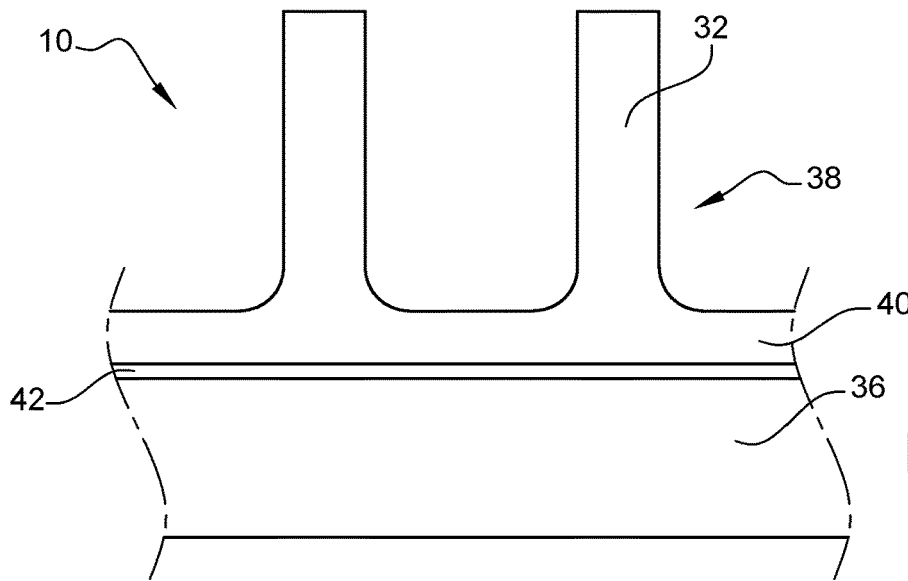
FIG. 9 is a view of the panel.

Each network 30 of stiffeners in the form of a grid therefore comprises stiffeners 32, indicated schematically in FIGS. 7 and 8 and the main function of which lies in stabilizing the panel. These figures make it possible to detail the design of the panel 10 which, overall, comprises two distinct entities joined together. These are, first of all, a main sheet 36, which extends over the entire surface area of the panel, and which is perhaps substantially planar. This sheet 36 is made from a composite material with unidirectional fibers. The resin may be epoxy resin but may also be a thermoplastic resin such as PEEK, PPS or the like, while the unidirectional fibers may be glass fibers and/or carbon fibers running parallel to one another.

Figure 6:
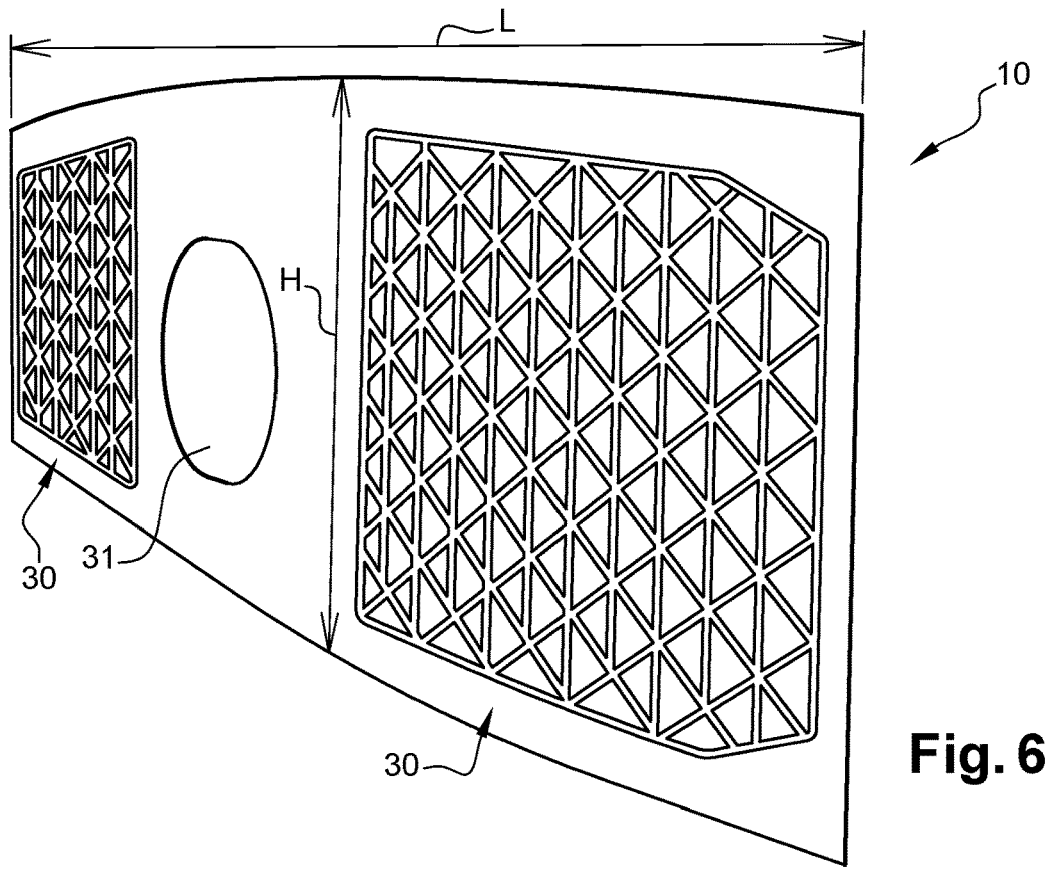
FIG. 6 is a perspective view of the panel shown in FIG. 5, from a different viewpoint and without its surrounding elements.

The maximum length L of the panel 10 and of the main sheet 36, referenced in FIG. 6, may be greater than 2 m and, for example, of the order of 3 m. Their maximum height H may be greater than 0.5 m and, for example, of the order of 1 m, and more generally comprised between 0.5 and 5 m. The thickness E of the main sheet 36, referenced in FIG. 7, itself comes out between 1 and 40 mm. This thickness E may be constant, even though variations may be envisaged, without departing from the scope of the invention.

The main sheet 36, of rectangular overall shape, has two opposite lateral faces. The first face 36a, which may be substantially planar, constitutes the smooth and unstructured exterior lateral surface of the panel 10. Thus it is not coated with any additional layer. By contrast, the second face 36b of the main sheet 36 is coated with a stiffening structure 38 forming the network(s) 30 of stiffeners 32 in the form of a grid. More specifically, the stiffening structure 38 is secured to the face 36b and produced as a single piece/a single block, from a composite material comprising resin and chopped fibers.

This composite material may be obtained from a block of SMC ("Sheet Molding Compound" or "Sheet Molding Composite") material, subsequently compression molded, as will be described later on. The resin is of the vinyl ester, polyester, epoxy type, but may also be thermoplastic: polyetheretherketone (PEEK) or polyphenylenesulfide (PPS). The chopped fibers are glass and/or carbon fibers, the major length of which may be between 10 and 100 mm. What is meant by the major length is the longest dimension between any two points on the fibre. These valves testify to the short length desired for these chopped fibers, notably by comparison with the unidirectional fibers of the main sheet 36.

The stiffening structure 38 comprises a base 40 of thickness e1 which may be uniform, for example between 1 and 5 mm. This base 40 adheres to the lateral face 36b of the main sheet 36, covering all or substantially all of this lateral face 36b. According to one embodiment not covered by the invention, an adhesive layer 42 may be interposed between them, as has been indicated schematically in FIG. 9.

On the opposite side of the base to the one that adheres to the main sheet 36, the stiffening structure 38 comprises the network(s) 30 of stiffeners 32 in the form of a grid, projecting from the base 40 in the opposite direction to that of the sheet 36. Furthermore, the stiffeners 32 may each extend in a height-wise direction substantially locally orthogonal to the main sheet 36. In this same direction, the maximum height h of the stiffeners 32 may be greater than 30 mm, and less than 150 mm. This height h may be the same for all the stiffeners of the panel 10, therefore leading to uniform heights. Alternatively, the height h of these stiffeners 32 may be variable, and therefore non-uniform, so as to adapt locally to the needs for stabilization. The thickness e2 of the stiffeners 32 itself proves to be between 2 and 5 mm.

As mentioned previously, the network(s) 30 of stiffeners in the form of a grid do not necessarily cover the entire base 40 from which they project, but rather zones of this base 40 may remain free. This is notably the case with the central zone of the base, through which the aforementioned opening 31 shown in FIGS. 5 and 6 passes, and which also passes through the main sheet 36.

Figure 10A:
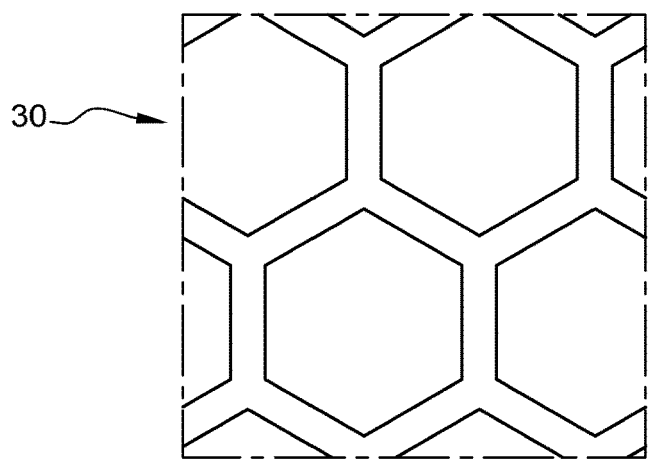
FIGS. 10a to 10e are side views of the panel shown in FIGS. 5 to 9, showing various possible patterns for the creation of the network of stiffeners incorporated into the panel.
Figure 10B:
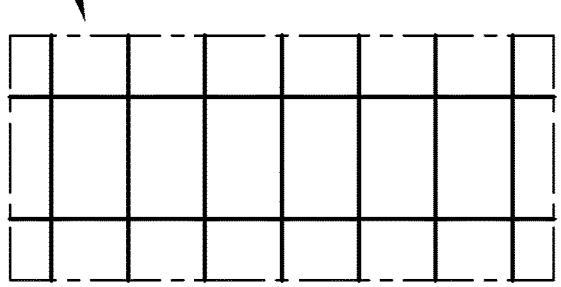
Figure 10C:
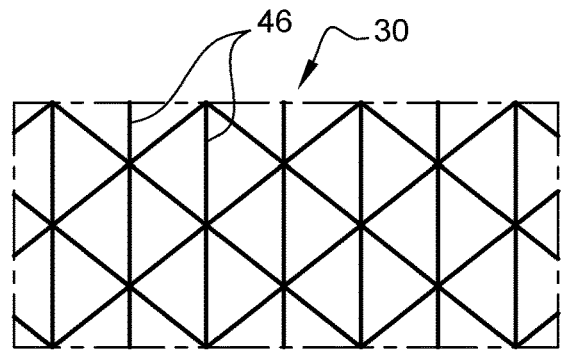
Figure 10D:
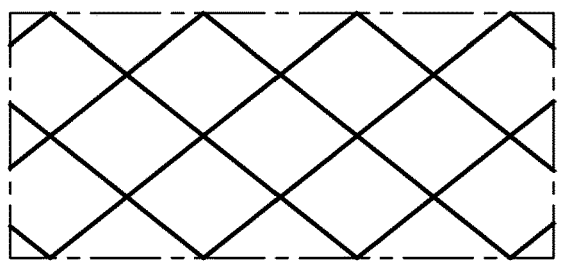
Figure 10E:
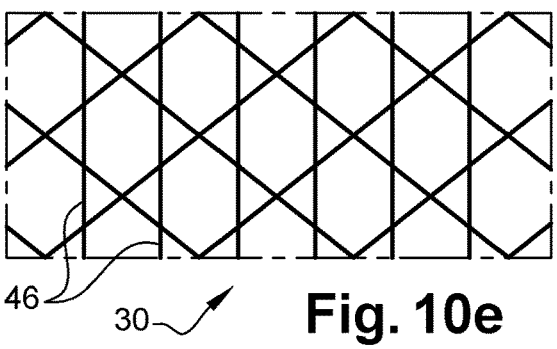

Each network 30 together with its stiffeners 32 forms a structured appearance in the form of a grid. The grid may adopt various geometries, such as those depicted in FIGS. 10a to 10e. In FIG. 10a, the stiffeners form a honeycomb structure with a repeating hexagonal pattern. This is a repeating square, rectangular or hexagonal pattern as indicated schematically in FIGS. 10b and 10d. As indicated schematically in FIGS. 10c and 10e, parallel lines 46 of stiffeners, which may or may not pass through the vertices of the repeating patterns, may be added to these repeating patterns.

Referring to FIG. 8, the position of certain chopped fibers 48 within the stiffening structure 38 is illustrated. In the vicinity of each transition zone 50 between one of the lateral faces 52 of a stiffener 32 and the exterior surface 54 of the base 40, these small-sized fibers 48 are locally oriented substantially parallel to the transition zone 50 concerned. In other words, the fact that these fibers 48 align themselves parallel to the transition zone 50, which zone may be curved to form a fillet radius, leads to a particularly effective load transfer between the stiffener 32 and the base 40. For example, this fillet radius is of the order of 10 mm radius at most. Similarly, in the vicinity of an interface 56 between the face 36b of the main sheet 36 and the interior surface 58 of the base 40, the chopped fibers 48 are oriented locally substantially parallel to this interface 56. Thus, the fact that these fibers 48 align themselves parallel to the interface 56 leads to a particularly effective load transfer between the base 40 and the sheet 36 through which the main load path of the panel 10 passes.

These improvements in the load transfer contribute to obtaining of superior mechanical performance for the panel, the overall mass of which remains controlled, and the manufacture of which proves fully compatible with a high production rate. In this regard, an exemplary embodiment of a method for manufacturing such a stiffened structural panel 10 will now be described.

Referring to FIGS. 11a to 11e, a step of compression molding the stiffening structure, which is performed directly on the main sheet is schematically illustrated.

Figure 11A:
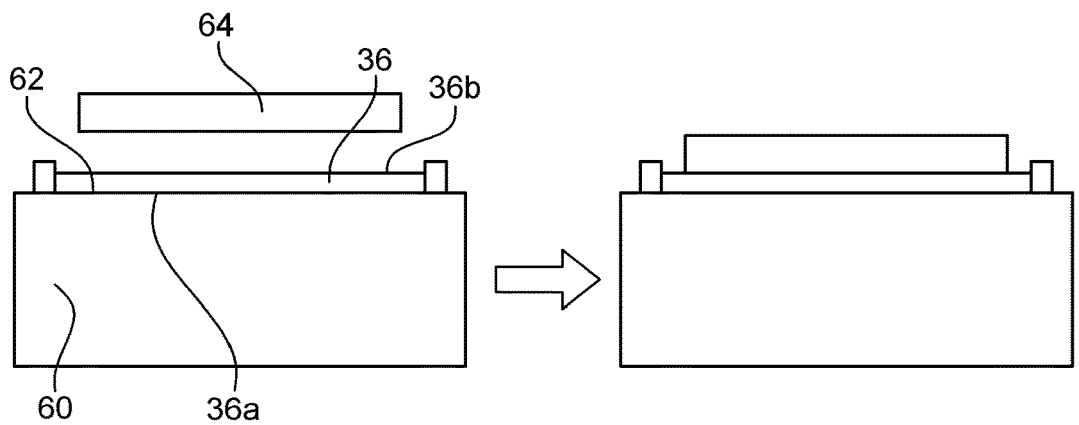
FIGS. 11a, 11a', 11a", 11b, 11c, 11d, and 11e are schematic views depicting the various successive operations of a step of compression molding the stiffening structure incorporated into the panel.
Figure 11A:
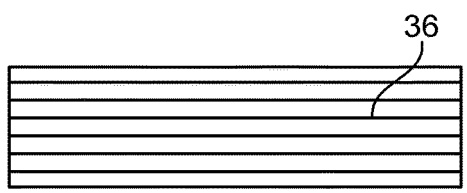
Figure 11B:
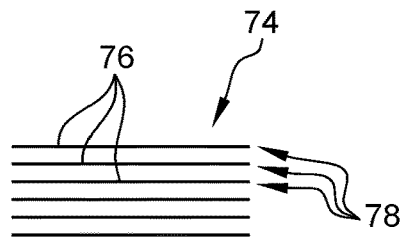
Figure 11B:
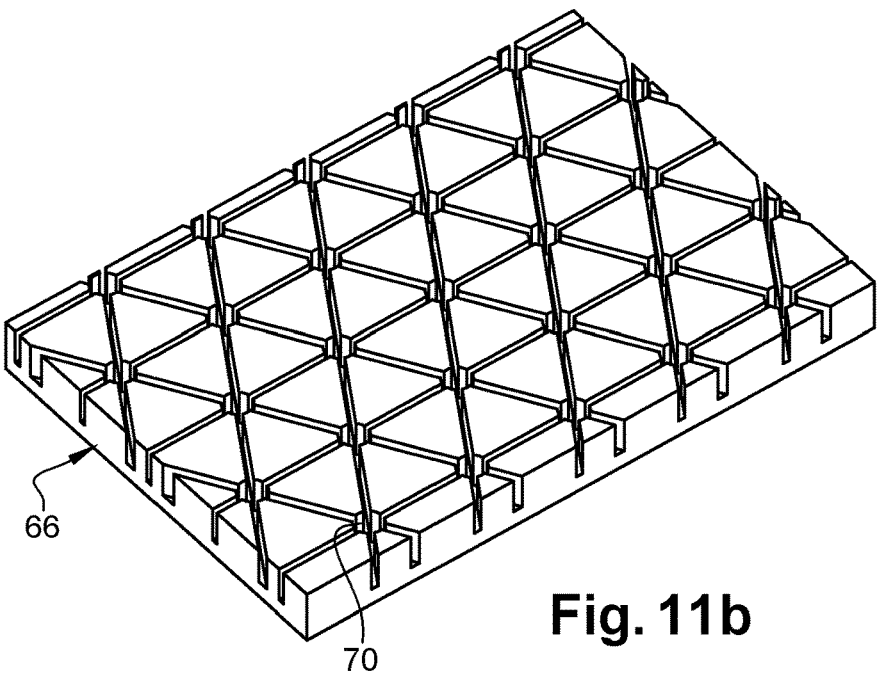
Figure 11C:
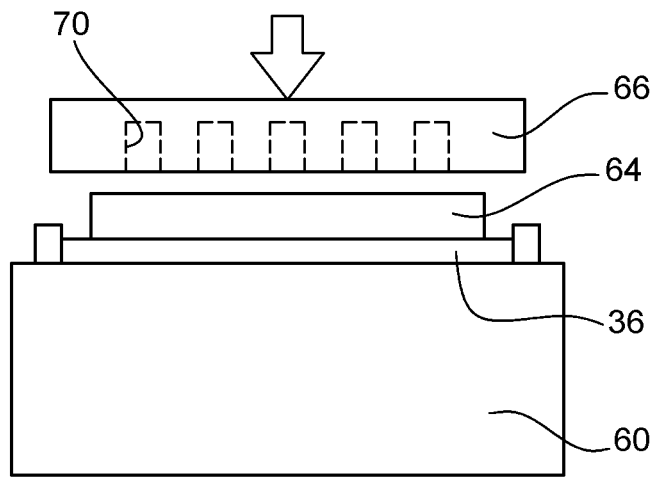
Figure 11C:
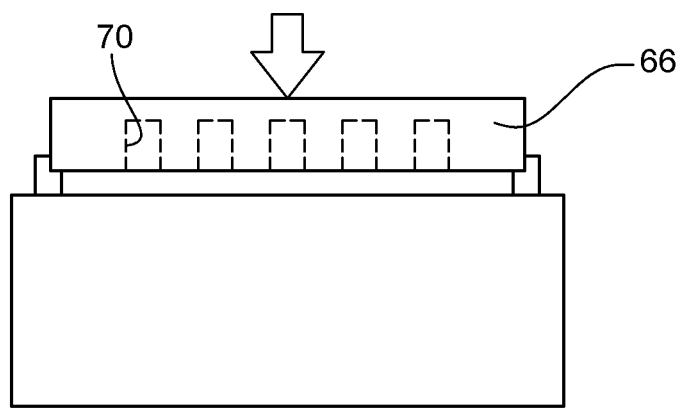
Figure 11C:
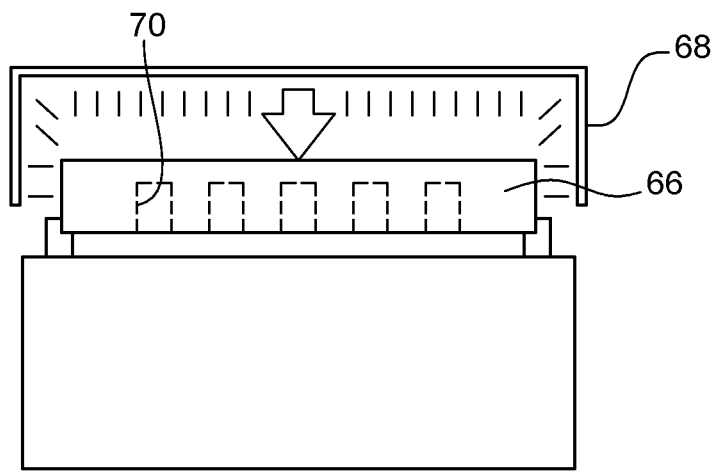

In order to do this, as shown in FIG. 11a, the main sheet 36 is placed on a supporting fixture 60, having a support face 62 of a shape that complements the face 36a of the sheet, namely in this instance a substantially planar shape. A block 64 of SMC material is brought onto the opposite face 36b of the sheet. This block 64 is formed of a prepolymer reinforced with chopped fibers described above, and has a uniform original thickness giving it a substantially parallelepiped shape. Once the block 64 has been placed on the previously cured sheet 36, the mold 66 of FIG. 11b is intended to be placed facing the block 64, pressed against this block, and then the whole is heated by heating means 68 as indicated schematically in FIG. 11c. The mold 66 has a shape that complements that of the desired network(s) of stiffeners, by providing molding cavities 70 of suitable shape. This mold may, for example, be produced by additive manufacturing.

Figure 11D:
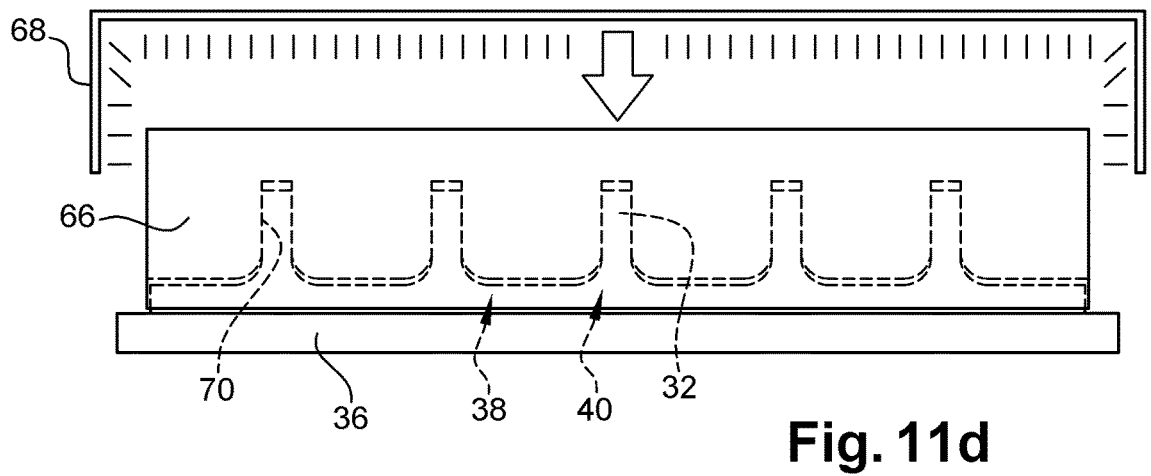
Figure 11E:
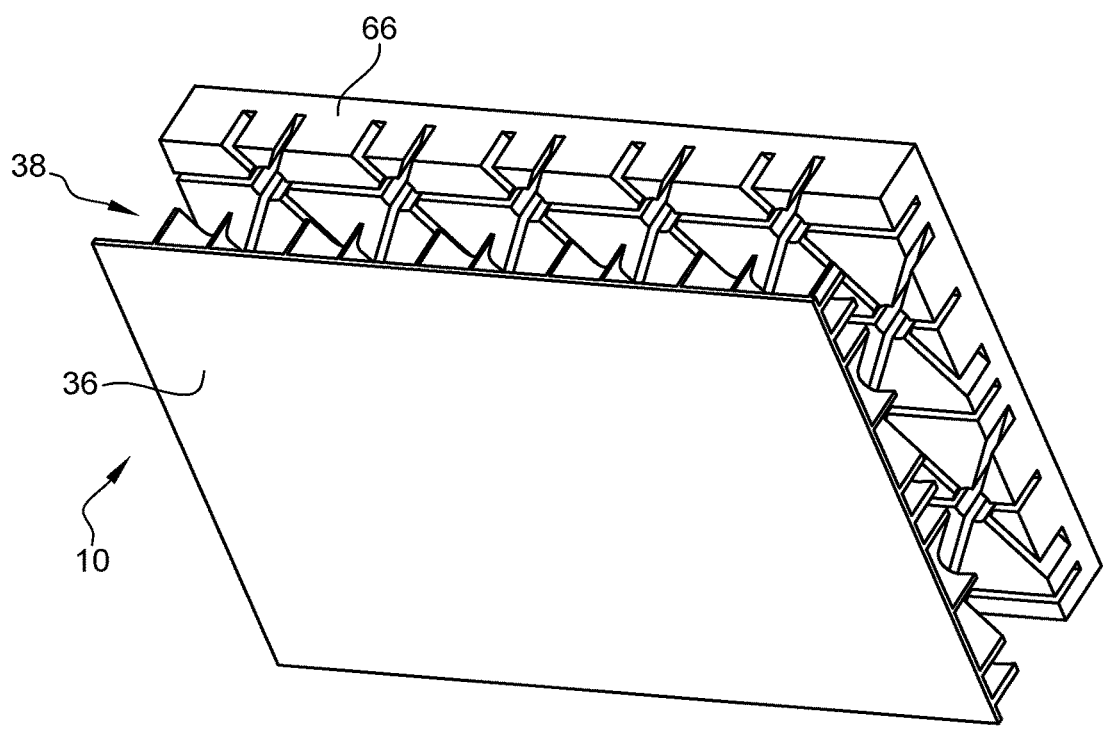

During the heating and compression which take place for several minutes at a temperature for example of 150° C. and at a pressure for example of the order of 100 bar, the material of the block of SMC enters the molding cavities 70 of the mold 66. This deformation of the block gripped between the mold 66 and the main sheet 36 causes the stiffening structure 38 to appear, with its base 40 and its stiffeners 32, as schematically indicated in FIG. 11d.

Finally, once the stiffening structure 38 has been shaped and cured, the panel 10 is demoulded. This operation, schematically indicated in FIG. 11e, thus reveals the panel with its main sheet 36 adhering to the stiffening structure 38.

Furthermore, as mentioned hereinabove, it is the previously cured sheet 36 depicted in FIG. 11a' which is placed on the supporting fixture 60. According to an alternative form of embodiment shown in FIG. 11a", it may be a collection 74 of pre-impregnated unidirectional fibers 76, which are arranged in the form of layered plies 78. In this instance, the plies 78 are arranged on the supporting fixture, then the block 64 of SMC is placed on top of the stack of these plies before the mold is manipulated in the same way as described above. The collection 74 of plies 78 is then intended to cure/polymerize together with the stiffening structure derived from the block 64 of SMC, during this compression molding step.

Figure 12:
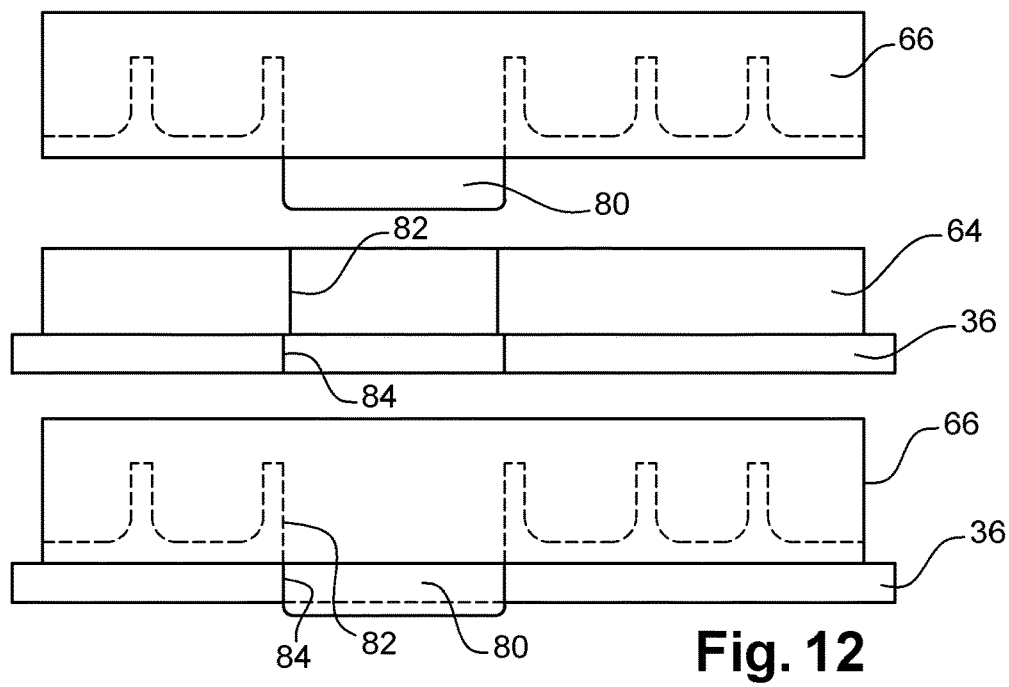
FIG. 12 is a schematic view showing a mold of a different shape for implementing the molding step.

FIG. 12 depicts an alternative form of the embodiment in which the mold 66 is equipped with a die 80 intended to penetrate an opening 82 in the block 64 of SMC, and an opening 84 of the sheet 36. This embodiment is adopted when the desired panel has the through-opening 31 shown in FIG. 6.

Figure 13:
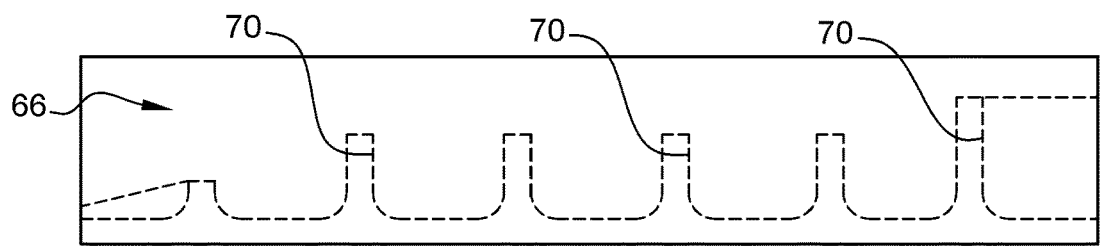
FIG. 13 is a schematic view showing yet another different form of mold.
Figure 13:
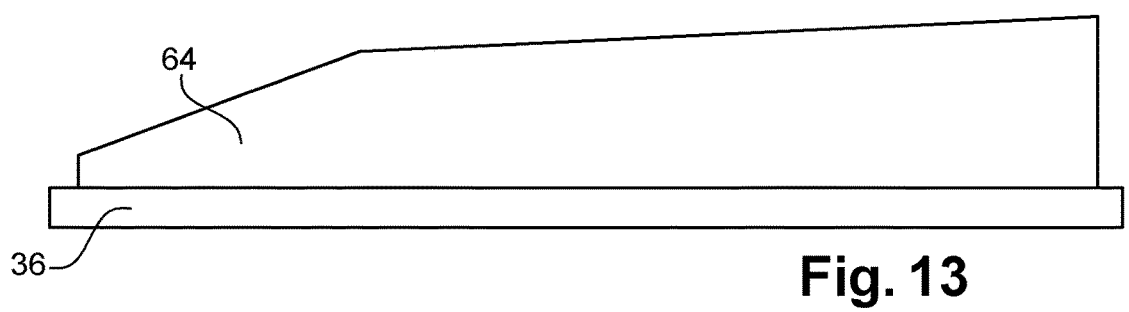

Of the other envisaged alternatives, the one depicted schematically in FIG. 13 shows a mold 66 with impressions for stiffeners 70 of different heights, specifically in order to obtain stiffeners of non-uniform heights. In line with the impressions for stiffeners 70 of shortest heights, the block 64 of SMC that is to be shaped may itself have a reduced thickness. In this alternative, the block 64 of SMC therefore no longer has a substantially parallelepiped shape, because of its non-uniform original thickness.

Figure 14:
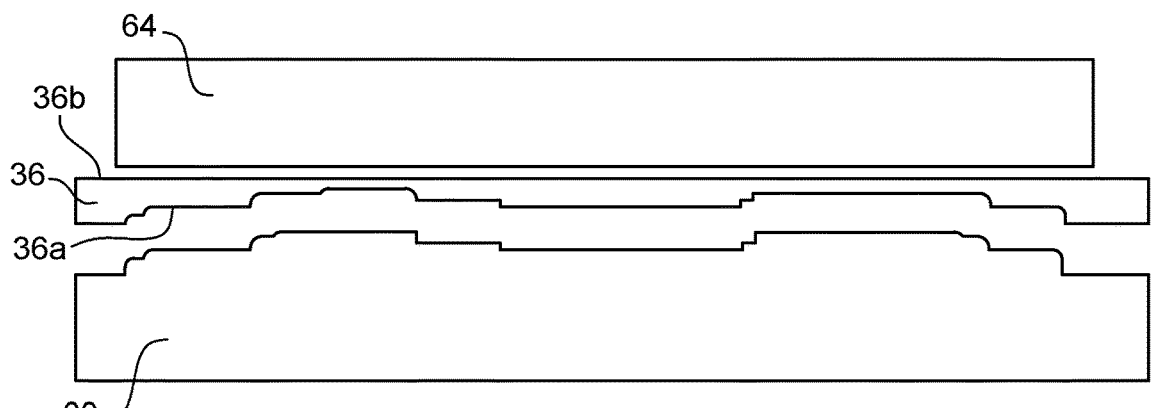
FIG. 14 is a schematic view of a fixture for supporting a main sheet, of a different form.

Finally, the alternative shown in FIG. 14 depicts a main sheet 36 with a structured lateral face 36a, which is to say a face that is nonplanar. In the preferred case in which the other lateral face 36b, intended to accept the block 64 of SMC, is planar, that means that the sheet 36 has a non-uniform thickness allowing the stiffness of the panel to be adapted locally. In that instance, the support face 62 of the support fixture 60 adopts a shape that complements that of the lateral face 36a of the main sheet.

Of course, various modifications may be made by those skilled in the art to the invention that has just been described, solely by way of non-limiting examples, and the scope of which is defined by the appended claims. In particular, the various embodiments and their various alternative forms may be combined.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an aircraft structure including an aircraft stiffened structural panel disposed between an aircraft wing and a central wing box for joining thereto, the aircraft stiffened structural panel comprising:
   a main sheet made of composite material with unidirectional fibers and comprising a forward zone, a central zone and a rear zone, the main sheet having an opening arranged in the central zone,
   the main sheet including two opposite lateral faces,
   a stiffening structure secured to the main sheet and arranged in at least one of the forward zone and rear zone, the stiffening structure being made of a composite material comprising a resin and chopped fibers, and further comprising a base, an adhesive layer interposed between the base and adhering to one of the two lateral faces of the main sheet, and a network of stiffeners in the form of a grid projecting from the base, wherein the at least one stiffener of the network has at least one curved transition zone between one of the lateral faces of the stiffener and an exterior surface of base of the stiffening structure, and further including fibers oriented substantially parallel to the transition zone,
   the method comprising:
   compression molding the stiffening structure from a block formed of a prepolymer reinforced with chopped fibers and arranged in contact:
   either with the previously-cured main sheet;
   or with a collection of pre-impregnated unidirectional fibers intended to cure together with the stiffening structure, during the course of this compression molding step,
   and compression molding the stiffening structure being implemented in such a way that the stiffeners appear on the block, and
   disposing the aircraft stiffened structural panel between the aircraft wing and central wing box.

2. The method according to claim 1, wherein the other of the two lateral faces of the main sheet forming an exterior surface of the panel.

3. The method according to claim 1, wherein the chopped fibers have a major length of between 10 and 100 mm.

4. The method according to claim 1, wherein the panel has at least one of the following dimensions:
   maximum length of the panel: between 1 and 8 m;
   maximum height of the stiffeners projecting from the base: between 30 and 150 mm;
   thickness of the base: between 1 and 5 mm;
   thickness of the stiffeners: between 1 and 10 mm; and,
   thickness of the main sheet: between 1 and 40 mm.

5. The method according to claim 1, wherein the method further comprising covering substantially the entirety of the lateral face of the main sheet to which it adheres by the base of the stiffening structure.

6. The method according to claim 1, wherein the stiffeners have uniform or non-uniform heights.

7. The method according to claim 1, wherein the other of the two lateral faces of the main sheet is structured.

8. The method according to claim 1, wherein the stiffening structure is made from a block of SMC material.

9. The method according to claim 1, wherein the at least one stiffener of the network has at least one curved transition zone between one of its lateral faces and the base of the stiffening structure.

10. The method according to claim 1, wherein the block intended to be molded has a non-uniform original thickness.

11. The method according to claim 4, wherein the maximum length of the panel between 1 to 8 m comprises a length of greater than 2 m.

12. The method according to claim 4, wherein the maximum height of the stiffeners projecting from the base between 30 to 150 mm further comprises a height of greater than 30 mm.

13. The method according to claim 4, wherein the thickness of the stiffeners between 1 and 10 mm comprises a thickness of between 2 and 5 mm.

14. A method for manufacturing an aircraft structure including an aircraft stiffened structural panel as a lateral panel of a rigid structure of a pylon for attaching a turbomachine, the aircraft stiffened structural panel comprising:
   a main sheet made of composite material with unidirectional fibers,
   the main sheet including two opposite lateral faces,
   a stiffening structure secured to the main sheet and made of a composite material comprising a resin and chopped fibers, and further comprising a base, an adhesive layer interposed between the base and adhering to one of the two lateral faces of the main sheet, and a network of stiffeners in the form of a grid projecting from the base, wherein the at least one stiffener of the network has at least on curved transition zone between one of the lateral faces of the stiffener and an exterior surface of base of the stiffening structure, and further including fibers oriented substantially parallel to the transition zone,
   the method comprising:
   compression molding the stiffening structure from a block formed of a prepolymer reinforced with chopped fibers and arranged in contact:

either with the previously-cured main sheet;

or with a collection of pre-impregnated unidirectional fibers intended to cure together with the stiffening structure, during the course of this compression molding step, and compression molding the stiffening structure being implemented in such a way that the stiffeners appear on the block, and incorporating the lateral panel of a rigid structure of a pylon for attaching a turbomachine.

15. A method for manufacturing an aircraft structure including an aircraft stiffened structural panel as an internal stiffening rib of a lateral wing box or of the central wing box, the aircraft stiffened structural panel comprising:

a main sheet made of composite material with unidirectional fibers and comprising a forward zone, a central zone and a rear zone, the main sheet having an opening arranged in the central zone, the main sheet including two opposite lateral faces, a stiffening structure secured to the main sheet and arranged in at least one of the forward zone and rear zone, the stiffening structure being made of a composite material comprising a resin and chopped fibers, and further comprising a base, an adhesive layer interposed between the base and adhering to one of the two lateral faces of the main sheet, and a network of stiffeners in the form of a grid projecting from the base, wherein the at least one stiffener of the network has at least one curved transition zone between one of the lateral faces of the stiffener and an exterior surface of base of the stiffening structure, and further including fibers oriented substantially parallel to the transition zone, the method comprising:

compression molding the stiffening structure from a block formed of a prepolymer reinforced with chopped fibers and arranged in contact:

either with the previously-cured main sheet;

or with a collection of pre-impregnated unidirectional fibers intended to cure together with the stiffening structure, during the course of this compression molding step, and compression molding the stiffening structure being implemented in such a way that the stiffeners appear on the block, and incorporating the internal stiffening rib of a lateral wing box or of the central wing box.

16. A method for manufacturing an aircraft structure including an aircraft stiffened structural panel configured to join aircraft components or separate zones from the outside, the aircraft stiffened structural panel comprising:

a main sheet made of composite material with unidirectional fibers and comprising a forward zone, a central zone and a rear zone, the main sheet having an opening arranged in the central zone, the main sheet including two opposite lateral faces, a stiffening structure secured to the main sheet and arranged in at least one of the forward zone and rear zone, the stiffening structure being made of a composite material comprising a resin and chopped fibers, and further comprising a base, an adhesive layer interposed between the base and adhering to one of the two lateral faces of the main sheet, and a network of stiffeners in the form of a grid projecting from the base, wherein the at least one stiffener of the network has at least curved transition zone between on of the lateral faces of the stiffener and an exterior surface of base of the stiffening structure, and further including fibers oriented substantially parallel to the transition zone, the method comprising:

compression molding the stiffening structure from a block formed of a prepolymer reinforced with chopped fibers and arranged in contact:

either with the previously-cured main sheet;

or with a collection of pre-impregnated unidirectional fibers intended to cure together with the stiffening structure, during the course of this compression molding step, and compression molding the stiffening structure being implemented in such a way that the stiffeners appear on the block, and incorporating the stiffening structure internally between aircraft component or separate zones from the outside.

* * * * *